UNITED STATES PATENT OFFICE.

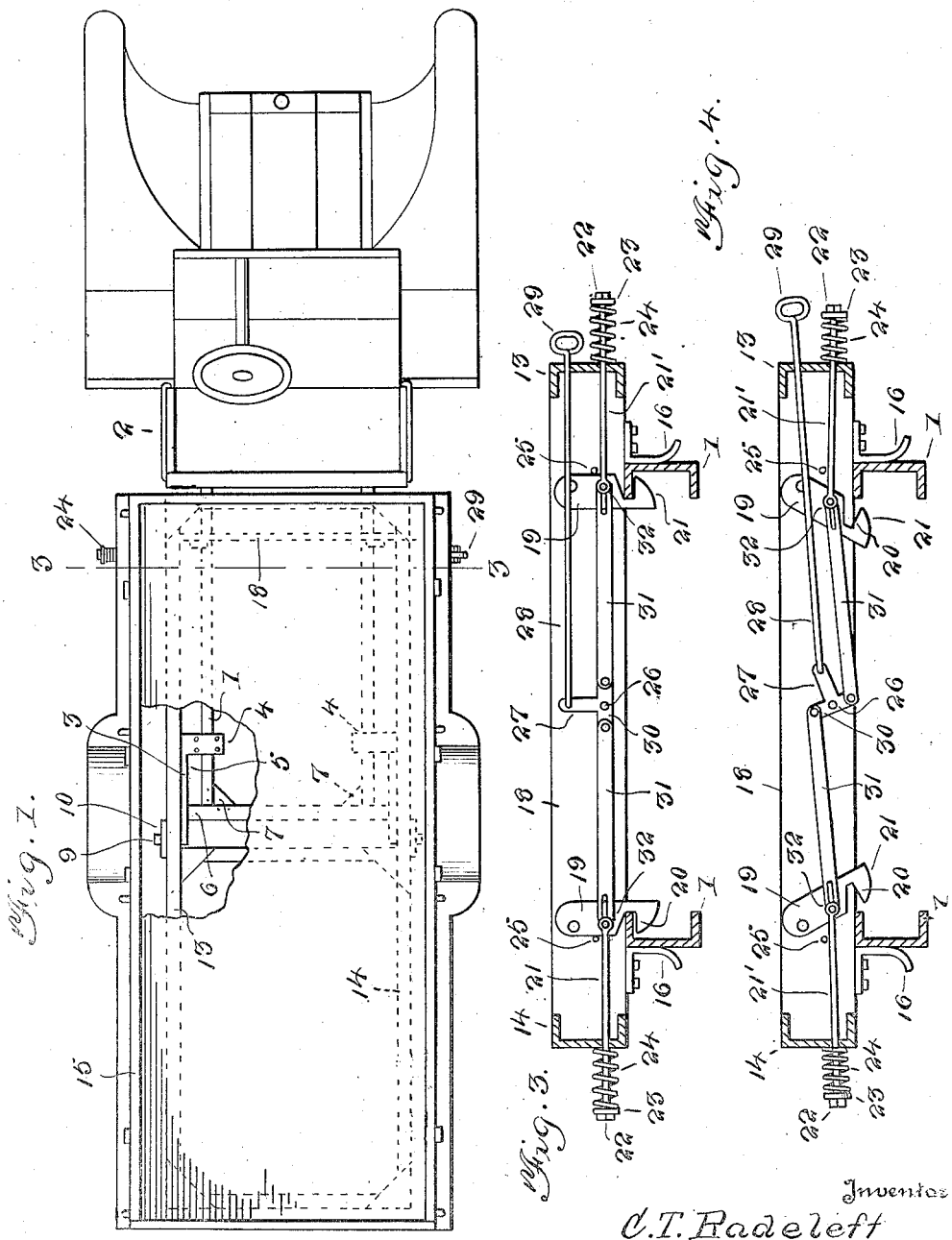

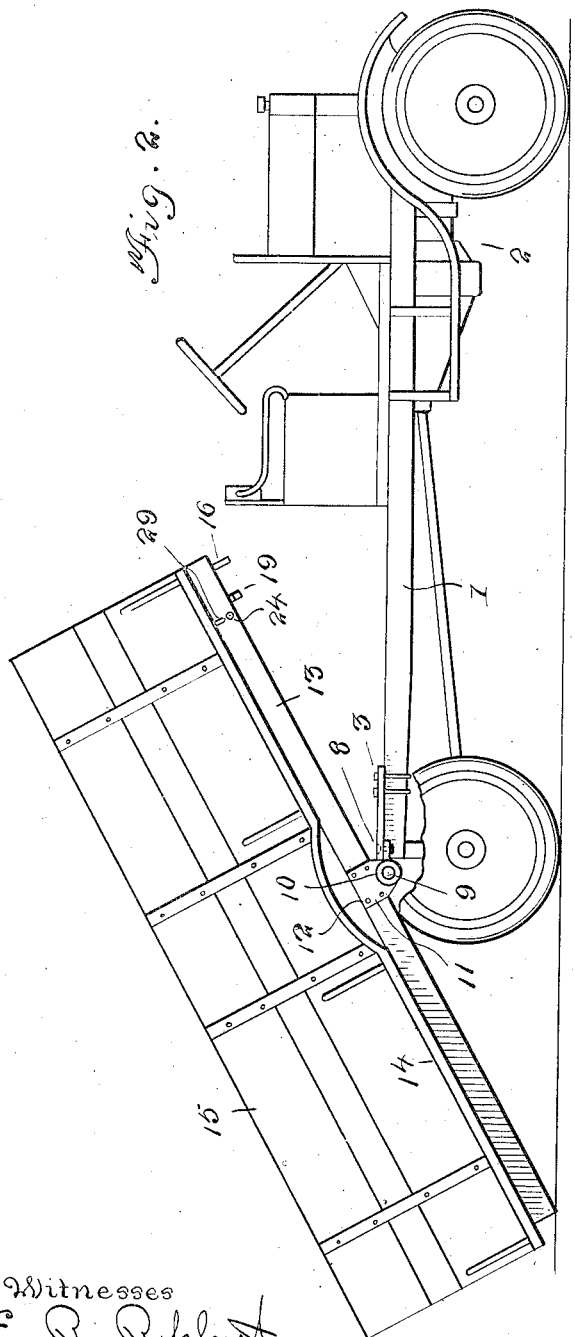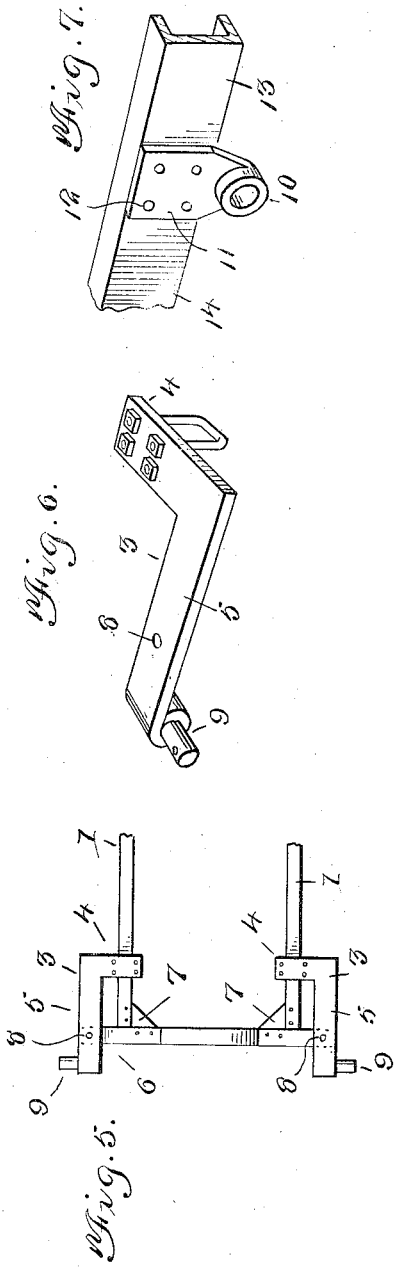

CHARLES T. RADELEFF, OF MANNING, IOWA.

DUMPING-TRUCK.

1,330,655.   Specification of Letters Patent.   Patented Feb. 10, 1920.

Application filed February 23, 1918. Serial No. 218,765.

*To all whom it may concern:*

Be it known that I, CHARLES T. RADELEFF, a citizen of the United States, residing at Manning, in the county of Carroll and State of Iowa, have invented new and useful Improvements in Dumping-Trucks, of which the following is a specification.

This invention relates to motor driven vehicles, and is more particularly directed to commercial or truck bodies therefor.

The object of the invention is to provide a simple but novel means for pivotally securing a truck body to the frame of any ordinary automobile and to provide the said body with latching means normally co-engaging with the frame for holding the body horizontally on the frame, and also adapted when actuated by suitable mechanism connected therewith for releasing the body from the frame to permit of the tilting of the body and the dumping of the contents therefrom.

Other objects and advantages will appear as the nature of the invention is better understood, reference being had to the accompanying drawings, in which;

Figure 1 is a plan view illustrating the arrangement of my improvement on the frame of a motor driven vehicle of the Ford type.

Fig. 2 is a side elevation of the same, the body being tilted to dumping position.

Fig. 3 is a sectional view approximately on the line 3—3 of Fig. 1.

Fig. 4 is a similar sectional view but illustrating the arrangement of parts when the latch members are actuated to bring the same to unlatching position.

Fig. 5 is a detail plan view illustrating the arrangement of the trunnions for the body on the frame or chassis of the machine.

Fig. 6 is a perspective view of one of the trunnions and the bracket carrying the same.

Fig. 7 is a perspective view of one of the channel members secured to the body and co-acting with one of the trunnions.

In carrying out my invention I secure upon the top of the channel members comprising the sides 1 of the frame or chassis 2 of a motor driven vehicle brackets 3. Each of these brackets includes a body portion in the nature of a flat L-shaped plate, the inner angle portions 4 of which is arranged over the sides 1 of the frame adjacent to the rear end of the frame. The ends 4 of the brackets are secured upon the side members 1 of the frame in any desired or preferred manner, such for instance as by the employment of U-bolts arranged beneath the side member 1 and straddling the same and passing through suitable openings in the ends 4 of the brackets and having their threaded ends secured by nuts which contact with the outer faces of the brackets. The longitudinal plates or members 5 of each of the brackets are projected a slight distance beyond the rear of the frame 2, and the said rear of the frame may be and preferably is provided with an end member 6 which extends a suitable distance beyond the sides of the frame, reinforcing angle plates 7 being arranged between the side members 1 and the end members 6. On this end member 6 the longitudinal plates of the brackets 3 rest and are secured by elements 8. The member 5 of each of the brackets upon its outer edge, and adjacent its end is formed with an outwardly extending trunnion 9 each providing a stub shaft that is designed to receive a box or journal 10 formed each on one end of a plate 11 that is secured by elements 12 to the sides 13 of the frame 14 of the truck body 15. By reference to the drawings it will be noted that the journal members 10 are arranged nearer the inner end of the body 15 than the outer end thereof, so that the portion of the body to the rear of the journal or bearings is weightier than the other and the body 15 will therefore automatically swing, by gravity, to tilting or dumping position.

The side members 13 of the frame for the body 15, adjacent to the inner or forward end of the body have secured on the under face thereof depending spring fingers 16, the lower edges of the same being preferably rounded outwardly. These fingers are designed to guide the frame 13 on the frame or chassis of the vehicle and also to prevent lateral movement of the frame 14 and body 15 when the same is arranged over the chassis.

To lock the body 15 on the chassis of the machine, I pivotally secure to the front cross bar 18 of the frame 14 depending dogs 19. Each of the dogs is in the nature of a flat plate, but is provided with a notched portion 20 and its inner edge below the said notch is rounded as at 21. The notch of each of the dogs 19 is designed to engage with the upper flange of the side members 1 of the chassis 2, and to bring the dogs automatically to such engagement I loosely connect to each of the same a rod 21' that passes through suitable openings or through clips provided therefor in the sides 13 of the dumping frame 14. The outer ends of these rods are threaded and have screwed thereon nuts 22 which contact with washers 23, and on the rods between the washers 23 and the sides of the dumping frame 14 are springs 24. The tension of the springs 24 may be adjusted by regulating the nuts 23, and the dogs may be limited in their swinging movement toward the springs by the employment of stop members 25.

The operating means for releasing the catch members or dogs 19, preferably includes the employment of a T-shaped lever which is centrally pivoted, as at 26 to the dumping frame 14. The central angle arm of the L-shaped lever is indicated by the numeral 27 and has loosely connected therewith an operating rod 28, the said rod passing through a suitable bearing opening in one of the sides of the dumping frame and having its outer end looped to provide a handle 29. The longitudinal arm 30 of the T-shaped lever has pivotally secured to the ends thereof links 31, which, of course, extend in opposite directions, and each of the said links is loosely connected as at 32 to one of the dogs 19. A pull on the handle 29 of the rod 28 will, of course, swing the T-shaped lever on its pivot 26, drawing the links 31 toward the center of the frame, and consequently bring the notch or engaging portions of the dogs away from the channeled sides of the chassis against the tension of the springs 24. The dumping frame, as previously stated being weighted at the outer end thereof will automatically swing to dumping position so that the load may be freely delivered therefrom. The grip on the handle 29 is, of course, released when the frame tips, and by elevating the rear of the frame, after the load has been deposited, the rounded edges 21 of the dogs will contact with the upper flanges of the side members of the chassis, swinging the dogs inwardly against the tension of the springs 24 until the notches 20 are brought opposite the said flanges of the side members of the chassis, when the springs 24 will bring the said dogs to locking position. The brackets or fingers 16, as previously stated, will guide the dumping body to proper position upon the side members of the motor frame or chassis, and it is believed, from the foregoing description, when taken in connection with the drawings, the simplicity and advantages of the construction will be apparent without further detailed description.

What I claim is:

1. In combination with the chassis of a motor vehicle, of a frame pivotally connected thereto, depending fingers carried by the frame and designed to be arranged against the opposite side members of the chassis when the frame rests on the chassis, pivoted dogs on the frame to engage with the said side members of the chassis to lock the frame thereon, a rod loosely connected with each of the dogs and extending through the frame, an adjustable element on the outer end of each of said rods, a spring on each of said rods contacted by said adjustable element, a T-shaped lever pivoted to the frame between the dogs, a link connection between the lever and each of the dogs, and an operating rod loosely connected with said lever.

2. In combination with a chassis, of a motor vehicle, of a frame connected thereto, depending fingers carried by the frame designed to be arranged against the opposite side members of the chassis when the frame rests thereon, pivoted dogs on the frame to engage with the side members of the chassis to lock the frame thereon, spring influenced means for bringing said dogs to such locking position, a link connected with each of said dogs, a pivoted element pivotally connected to the links, and an operating element connected with said pivoted element whereby when a pull is exerted thereon the links swing toward each other and bring the dogs out of engagement with said side members of the chassis.

In testimony whereof I affix my signature.

CHARLES T. RADELEFF.